(12) United States Patent
Tsimhoni et al.

(10) Patent No.: US 9,127,955 B2
(45) Date of Patent: Sep. 8, 2015

(54) ADAPTIVE USER GUIDANCE FOR NAVIGATION AND LOCATION-BASED SERVICES

(71) Applicant: GM GLOBAL TECHNOLOGY OPERATIONS LLC, Detroit, MI (US)

(72) Inventors: Omer Tsimhoni, Herzliya (IL); Peggy Wang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

(21) Appl. No.: 13/756,295

(22) Filed: Jan. 31, 2013

(65) Prior Publication Data

US 2014/0214322 A1   Jul. 31, 2014

(51) Int. Cl.
  *G08G 1/123*   (2006.01)
  *G01C 21/34*   (2006.01)
  *G01C 21/36*   (2006.01)

(52) U.S. Cl.
  CPC ............ *G01C 21/34* (2013.01); *G01C 21/3484* (2013.01); *G01C 21/3641* (2013.01)

(58) Field of Classification Search
  CPC .. G01C 21/00; G01C 21/28; G08G 1/096827; G08G 1/0129; G08G 1/096811
  USPC ........................................................ 701/534
  See application file for complete search history.

(56) References Cited

U.S. PATENT DOCUMENTS

| | | | | |
|---|---|---|---|---|
| 4,361,202 A | * | 11/1982 | Minovitch | 180/168 |
| 5,650,703 A | * | 7/1997 | Yardley et al. | 318/587 |
| 5,928,309 A | * | 7/1999 | Korver et al. | 701/470 |
| 6,129,025 A | * | 10/2000 | Minakami et al. | 104/88.01 |
| 6,330,503 B1 | * | 12/2001 | Sharp et al. | 701/50 |

(Continued)

OTHER PUBLICATIONS

Burges, Christopher JC. "A tutorial on support vector machines for pattern recognition." Data mining and knowledge discovery 2.2 (1998): pp. 121-167: available @ http://link.springer.com/article/10.1023/A:1009715923555: last accessed May 15, 2015.*

(Continued)

*Primary Examiner* — Behrang Badii
*Assistant Examiner* — Daniel L Greene
(74) *Attorney, Agent, or Firm* — John A. Miller; Miller IP Group, PLC

(57) ABSTRACT

A method for adaptive driver guidance for navigation and location-based services. A navigation system onboard a vehicle records errors, including both system errors and user errors, where the errors can be detected by missed turns, re-routing, and similar events. The error data is transmitted to a central server, where the data is analyzed to determine patterns of errors, both for an individual driver and across many drivers. Roadway locations which frequently experience driver navigational errors have the error type integrated as a route feature, and future navigational guidance is adapted to improve driver performance. Adaptations can include increased or decreased frequency, detail, timing and location of navigational instructions. Individual driver guidance can also be adapted based on the driver's tendency to make errors in response to specific guidance instructions. Adaptation of guidance for location-based services is also provided.

16 Claims, 3 Drawing Sheets

(56) References Cited

U.S. PATENT DOCUMENTS

| | | | |
|---|---|---|---|
| 6,618,683 B1* | 9/2003 | Berstis et al. | 702/94 |
| 7,663,505 B2* | 2/2010 | Publicover | 340/932 |
| 8,301,377 B2* | 10/2012 | Kamel et al. | 701/523 |
| 2002/0091473 A1* | 7/2002 | Gardner et al. | 701/35 |
| 2007/0021913 A1* | 1/2007 | Heiniger et al. | 701/213 |
| 2007/0276596 A1* | 11/2007 | Solomon et al. | 701/211 |
| 2008/0071467 A1* | 3/2008 | Johnson et al. | 701/118 |
| 2010/0185366 A1* | 7/2010 | Heiniger et al. | 701/50 |
| 2012/0239293 A1* | 9/2012 | Bhatt | 701/469 |

OTHER PUBLICATIONS

Duda, Richard O., Peter E. Hart, and David G. Stork. Pattern classification. John Wiley & Sons, 2012. pp. 24,25, 28,61 and 62 61,62: available@ http://books.google.com/books?hI=en&Ir=&id=Br33IRC3PkQC&oi=fnd&pg=PR3&dq=naive+bayes+classifier+pattern+recognition&ots=2wxRLyfdGm&sig=J0Fb2EzzXySIsUx4ifdHVyFsqq0: last acessed May 15, 2015.*

2006 Cadillac CTS Navigation System 158 pages.*

* cited by examiner

ADAPTIVE USER GUIDANCE FOR NAVIGATION AND LOCATION-BASED SERVICES

BACKGROUND OF THE INVENTION

1. Field of the Invention

This invention relates generally to adaptive driver guidance in a vehicle navigation system and, more particularly, to adaptive guidance for navigation and location-based services, where navigation errors are recorded by a navigation system along with data about the location and circumstances of the errors, the error data is analyzed to detect patterns of error repetition, and the navigation error patterns are used to adapt the navigational guidance provided to drivers at error-likely locations.

2. Discussion of the Related Art

Navigation systems have become increasingly popular with vehicle drivers in recent years, as the functionality and reliability of such systems have improved dramatically. Many new vehicles include a navigation system delivered as original equipment by the vehicle manufacturer, which is typically integrated with a telematics system and vehicle audio/visual systems. Other types of navigation systems include stand-alone devices which can be purchased and simply placed in a vehicle, and even smart phones equipped with navigation application software. With all of these types of navigation systems, route planning, visual map display and turn-by-turn driver guidance are available. These features have made navigation systems virtually indispensable to many drivers.

However, nearly every driver and every navigation system will occasionally experience errors. Such errors can be caused by a variety of factors, including user errors—such as failing to follow instructions, and system errors—such as loss of GPS satellite signals. It has been observed that some drivers are particularly prone to navigational errors, regardless of where they are driving. Some driving routes and roadway locations, particularly those with irregular road geometries, are also susceptible to driver navigation errors, such as missed exits and wrong turns. Similarly, some system errors occur regularly at certain locations, such as in tunnels and "urban canyons" where satellite signals are obstructed or distorted. In addition, driving errors can occur when a driver is receiving location-based services (LBS) guidance. It would be advantageous to capture navigation error data and use the data to adaptively modify the guidance given to drivers.

SUMMARY OF THE INVENTION

In accordance with the teachings of the present invention, a method is disclosed for adaptive driver guidance for navigation and location-based services. A navigation system onboard a vehicle records errors, including both system errors and user errors, where the errors can be detected by missed turns, re-routing, and similar events. The error data is transmitted to a central server, where the data is analyzed to determine patterns of errors, both for an individual driver and across many drivers. Roadway locations which frequently experience driver navigational errors have the error type integrated as a route feature, and future navigational guidance is adapted to improve driver performance. Adaptations can include increased or decreased frequency, detail, timing and location of navigational instructions. Individual driver guidance can also be adapted based on the driver's tendency to make errors in response to specific guidance instructions. Adaptation of guidance for location-based services is also provided.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for adaptive user guidance for navigation and location-based services is merely exemplary in nature, and is in no way intended to limit the invention or its applications or uses.

Many vehicle drivers use navigation systems to provide route guidance and maps, including turn-by-turn navigational guidance. Navigation systems used by drivers include systems integrated with the vehicle by the vehicle manufacturer, hand-held systems which the driver simply places in the vehicle, and even smart phones equipped with a navigation application.

With any type of navigation system, errors are inevitable. This includes system errors and driver errors. System errors occur when the navigation system provides inaccurate or untimely information, or fails to provide information, due to a loss of Global Positioning System (GPS) satellite signals or for other reasons. Driver errors occur when a driver misunderstands or fails to follow navigation instructions, and makes a wrong turn, misses a turn, etc. Some drivers, under some circumstances, are more prone to making driving or navigational errors than others. Similarly, some driving routes and roadway locations also experience a relatively high frequency of navigational errors.

Figure 1:
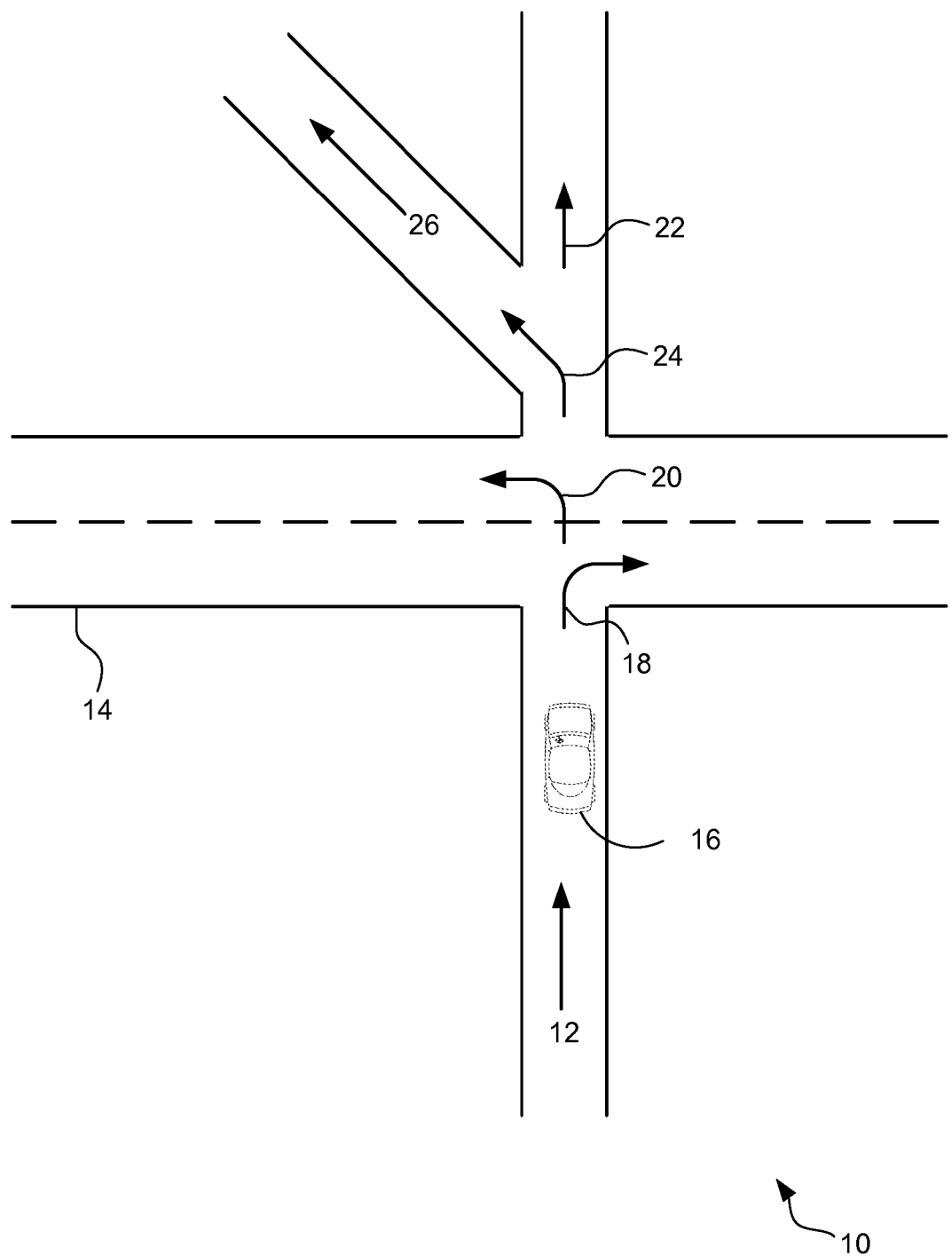
FIG. 1 is an illustration of a roadway where drivers frequently make mistakes when attempting to follow navigational guidance.

FIG. 1 is an illustration of a roadway 10 where drivers may frequently make mistakes when attempting to follow navigation guidance. The roadway 10 includes a northbound lane 12 which intersects an east-west crossroad 14. A vehicle 16 is traveling on the northbound lane 12, and the driver is receiving navigation guidance from a navigation system. When approaching the crossroad 14, the driver of the vehicle 16 is faced with several choices. The vehicle 16 can make a right turn 18, make a left turn 20, or continue straight ahead at 22. The three aforementioned choices are to be expected by the driver of the vehicle 16. However, the roadway 10 also includes a fourth navigation choice—namely a diagonal left 24 onto road 26. The diagonal left 24 may be an unexpected option to the driver, and furthermore, it may be difficult to see. If the navigation system in the vehicle 16 simply instructs the driver to "turn left onto road 26", the driver could mistakenly make the left turn 20 onto the crossroad 14.

Other roadway geometries which are similarly susceptible to driver navigation errors can easily be envisioned. Such error-likely types of roadways include double exit lanes, where two exit lanes split from a multi-lane expressway and then further split right and left, and roads with two closely-spaced intersections. Driving errors are also likely at any roadway location where an interchange or intersection is difficult to see—such as where visibility of a turn or exit is obstructed by a tree, a sign, a railing or a hill. Furthermore, some navigation routes and roadway locations are prone to system errors, such as weak GPS signals. The method described below has been developed to capture and recognize all of these types of repetitive navigation errors, and provide adaptive guidance to drivers to help reduce the incidence of driver error. The method is also applied to repetitive errors by an individual driver regardless of location, and to location-based services which may be provided by a navigation system.

In general terms, the method has three phases. In the first phase, navigation error data is recorded by navigation systems onboard individual vehicles and collected at a central server or on a distributed set of servers ("cloud"). In the second phase, the recorded error data is analyzed to detect patterns of errors, including repetitive errors associated with individual drivers and the context in which an error occurred (e.g., day/night, vehicle speed, driver age), and repetitive errors associated with navigation routes and roadway locations. In the third phase, driver guidance is adapted based on the error patterns, to increase the likelihood that the driver will properly follow the intended route.

Figure 2:
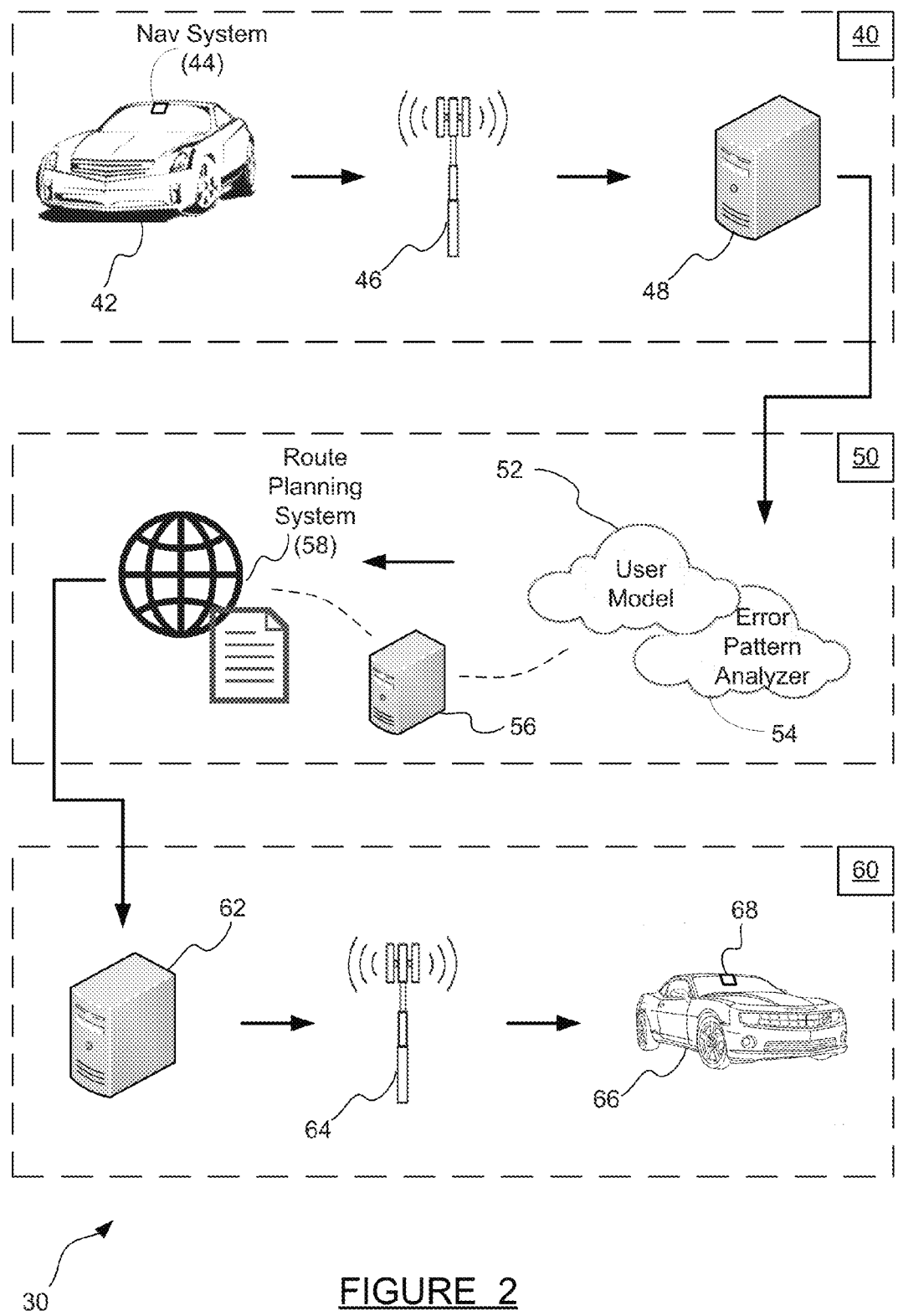
FIG. 2 is a schematic diagram of a system for providing adaptive user guidance for navigation and location-based services.

FIG. 2 is a schematic diagram of a system 30 for providing adaptive user guidance for navigation and location-based services. The system 30 includes a record section 40, an analyze section 50 and an adaptive guidance section 60. In the record section 40, a vehicle 42 includes a navigation system 44. The navigation system 44 operates in a manner familiar to those skilled in the art, whereby the navigation system 44 provides navigation guidance (including turn-by-turn instructions) to a driver-specified destination location. However, the navigation system 44 of the system 30 also captures errors encountered during navigation.

When a navigation error is detected by the navigation system 44, data about the error and the circumstances surrounding it are captured. Several different factors can cause the navigation system 44 to recognize that a navigation error has occurred. The system 44 itself can detect an error which may be caused by its inability to determine a current location, which may in turn be due to weak GPS signals. Driver errors can be identified in a variety of ways, including identifying when a recalculation of the navigation route after the driver leaves the route has occurred, identifying a missed turn, turning the wrong way, missing or taking a wrong highway exit, a request by the driver for more instructions, or even a traffic accident which may be attributed to a driver's attempt to follow navigation instructions (turning right from a left-hand lane, etc.). The navigation system 44 may also include a button which the driver can press in the event of a navigation error, or a voice-recognition command. The navigation system 44 could even detect an error via user dissatisfaction, which could be recognized by a driver monitoring system or an emotion detection mechanism.

The error data which is captured may include the location at which the error occurred, the route direction which was being followed, and the speed and lane position of the vehicle 42. The error data also includes information about the vehicle 42, including the model, size and type (small car vs. delivery truck, etc.). The error data also includes all relevant information about the roadway properties—including number of lanes, speed limit, road curvature and banking, number and type of exit lanes, and intersection information. The error data further includes road conditions which are variable, such as lighting (natural and artificial), visibility, temperature, road wetness, ice or snow, etc. In addition, the error data can include traffic conditions, including traffic density and average speed. Road construction, accidents and other special events can also be included in the recorded error data. The error data may also include information about the driver, including a driver identifier which can be used to correlate navigation errors to an individual driver. The driver identifier may be encrypted or made anonymous in order to protect the privacy of individuals.

The navigation system 44 uses a transmission means 46 to transfer the error data to a central server 48. The server 48 could represent a set of distributed servers. The transmission means 46 can be a cellular phone service provider, communicating with a mobile phone or telematics system onboard the vehicle 42—which is further in communication with the navigation system 44. The transmission means 46 can also be a satellite communication system, or a vehicle-to-vehicle (V2V) or vehicle-to-infrastructure (V2I) communications system, or any other wireless communication system. The transmission means 46 could even be a wired communication which takes place when the vehicle 42 is taken to a service center, for example. The central server 48 receives error data from many other vehicles in addition to the vehicle 42. For example, the central server 48 could receive navigation error data for all vehicles equipped with a certain vehicle manufacturer's telematics system and service.

The analyze section 50 receives and processes the accumulated error data from the record section 40. Specifically, algorithms 52 and 54 are applied to the error data from the central server 48. The algorithm 52 is a user model, which analyzes each particular driver's past errors to detect patterns for that driver, and correlates one driver's errors with errors from other drivers to identify the significance of factors such as age, gender, and driving experience. The algorithm 52 detects a driver's tendency to make errors when following navigation guidance, where the errors include turning too early, missing a turn, and others.

The algorithm 54 is a machine learning or other algorithm which can detect patterns in the error data from the central server 48. Examples of machine learning techniques which may be used in the algorithm 54 include Support Vector Machine (SVM) and Naïve Bayes classifier, among others which would be understood by those skilled in the art. The algorithm 54 identifies error patterns across maneuvers and routes, and across drivers. Although some roadway locations may have very obvious navigation error issues under any and all conditions, other navigation error patterns may only occur under certain combinations of roadway location, traffic conditions and road conditions. These subtle patterns in the error data can be detected by sophisticated machine learning techniques in the algorithm 54. The algorithms 52 and 54 can run on the central server 48, or on one or more other devices, such as a server 56.

Both the algorithm 52 and the algorithm 54 are designed to detect repetitive trends and patterns in navigation errors. That is, a single navigation error at an intersection probably does not warrant adaptation of the guidance given at that intersection. But if a significant percentage of drivers—for example, 5% or more—make a navigation error at a certain intersection or exit ramp, then that intersection or exit ramp is particularly error-likely and is in need of improved navigation guidance. Where possible, the reason for navigation errors will also be determined, such as complicated roadway configuration, poor nighttime lighting/visibility, GPS signal blockage, etc.

Errors which rise to a predetermined level of significance will be incorporated as a property of the user or the route in route planning system 58, and be used to provide adaptive driver guidance in subsequent navigation routes. For example, if a significant number of drivers miss the turn lane 20 of FIG. 1, an advance explanation could be incorporated into the navigation guidance (warning the driver of the upcoming secondary "exit"), and instructions to slow down in order to avoid missing the turn could also be added. Many different types of adaptive guidance could be included in navigation instructions, accounting for error-likely road geometries, real-time road and traffic conditions, and combinations thereof. Furthermore, where system errors frequently occur due to lost GPS signal, advance notice of upcoming maneuvers could be provided, or the navigation system 44 could be temporarily switched to a "dead reckoning" mode. In the case of a driver who is particularly prone to making navigation errors, or a driver who chooses an "error averse" setting, an extra notification of upcoming turns could be added—for example, providing four notifications instead of the standard three notifications. Conversely, a driver who rarely makes navigation errors may only need two advance notifications of a turn instead of three. The route planning system 58 provides both driver-specific and route-specific adaptive guidance designed to minimize the occurrence of navigation errors. The route planning system 58 can run on the server 56, or other computer hardware, including a server 62 discussed below.

The adaptive guidance section 60 actually delivers adaptive navigation guidance to drivers upon request, using the adaptations identified in the analyze section 50. The server 62 provides adaptive navigation guidance via transmission means 64 to a driver of a vehicle 66 which includes a navigation system 68. The server 62 is any server suitable for providing navigation instructions to a vehicle's navigation system. The server 62 receives the adaptive guidance instructions from the route planning system 58, which either runs on the server 56 or directly on the server 62. The transmission means 64 uses any wireless communication technique suitable for the purpose, such as cellular, V2V/V2I, etc., as discussed previously for the transmission means 46.

When the driver of the vehicle 66 uses the navigation system 68 to request navigation guidance, the server 62 provides guidance which may include any adaptations appropriate for the driver, the route and the current conditions. As discussed in detail previously, the adaptations can be manifested in many different ways—including more or fewer notices of upcoming maneuvers, earlier or later timing of notices of upcoming maneuvers, guidance about speeds or lane positions, more verbose descriptions of what to do and what not to do, etc. Also as discussed previously, the adaptations of the navigation guidance may be different for one driver than for another driver following the same route, and may be different for one driver from one day to the next under varying driving conditions. Not all routes, or maneuvers within a route, will be adapted or changed from the standard guidance. Adaptations will only be applied to maneuvers (turns, exits, etc.) for which the error data indicates it is appropriate.

Guidance adaptation—whether for an individual driver or for a route or roadway location—can be further modified after the effectiveness of initial adaptive guidance is determined. For example, if it is determined that a "be careful of the upcoming tricky exit" notification is not very effective at reducing the incidence of navigation error at a certain intersection or freeway exit, then a "slow down" notification could be provided to drivers in the future. Likewise, if certain types of notifications are found to be effective with an individual driver, those types of notifications would be continued in the future, and vice versa. Visual indicators of error-likely locations may also be provided on an in-vehicle map display. Furthermore, roadway locations with high navigation error rates may be avoided in future route selections. This could be accomplished by applying a penalty function to a route based on past navigation error rates.

An adaptive navigation guidance system can also be provided which is entirely self-contained in the vehicle 42 and the navigation system 44, and does not require connectivity to a central database or server. In this embodiment, only data from the navigation system 44 is considered—that is, only data from the driver or drivers of the vehicle 42. For example, if the vehicle 42 has more than one regular driver, the adaptive guidance feature of the navigation system 44 could maintain a user model for each of the regular drivers. In such a case, one of the drivers may need or request more frequent notifications of upcoming maneuvers, and another of the drivers may need or request less frequent notifications. These settings could be met by the adaptive guidance feature of the navigation system 44. The navigation system 44 could also provide adaptations for routes which have been travelled previously by the vehicle 42, and even provide adaptations for a given route based on traffic conditions and road conditions if sufficient data is available.

Location-based services (LBS) is a feature which has recently increased in popularity in navigation systems. With LBS, a person's current location is used—along with other factors, such as time of day, personal preferences, etc.—to provide customized offers for products and services to the person. For example, a man who is known to frequently stop at a certain coffee shop could be offered a discount if he is near the coffee shop at a time when business is slow. Likewise, a woman could be notified of a sale on a particular brand of clothing at a store, or a "no waiting" status at a hair salon, when she is nearby the store or the salon. Because location is obviously known by navigation systems, LBS features have naturally been added to many navigation systems.

The adaptive guidance features discussed in detail above can also be included in LBS-initiated navigation guidance. Consider a case where a man accepts an LBS promotion to purchase a shirt at a particular store, which is located in a shopping mall near his current location. The man is driving the vehicle 66 containing the navigation system 68, which includes LBS functionality, and which then guides the man to a parking garage for the mall. However, there may be data available to the route planning system 58 which indicates that vehicles are currently spending an average of 20 minutes driving around the parking garage before being parked. Parking lot congestion could also be determined using probabilities computed for the current day and time (that is, Friday evenings are always very busy, but Tuesday afternoons are not, etc.).

Based on information about the LBS destination, or the route to it, several different adaptations to the navigation guidance could be made. These adaptations include recommending a different parking lot, planning an alternate route so as to encounter more favorable traffic conditions, notifying the man of the expected wait time, or even suppressing the LBS promotion altogether.

In another LBS scenario, drivers may frequently miss a turn, such as a parking lot entrance which is obstructed. Adaptations for a frequently missed turn in LBS guidance can be handled in a similar fashion as in other driving situations; that is, a "slow down" notice can be issued, additional notifications of the turn can be provided, etc. In any LBS scenario, actual adaptation of the guidance—the frequency and content of the driving instructions—is possible, based on individual and collective driver performance in the past.

Figure 3:
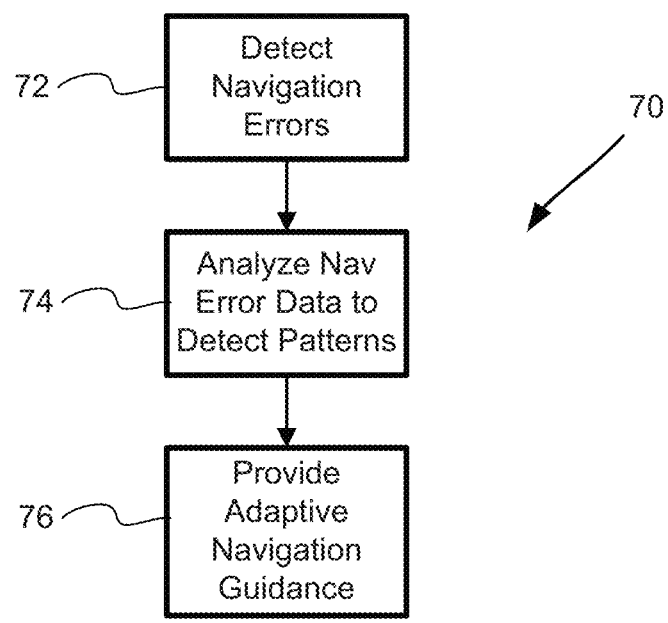
FIG. 3 is a flowchart diagram of a method for providing adaptive user guidance for navigation and location-based services.

FIG. 3 is a flowchart diagram 70 of a method for providing adaptive user guidance for navigation and location-based services. At box 72, navigation errors are detected, and navigation error data is recorded and stored. As discussed previously, the navigation error data can be from many different vehicles, and any roadway or navigation route. At box 74, the navigation error data is analyzed to detect patterns in the data. The patterns can be associated with individual drivers, and/or particular roadway locations and navigation routes. The patterns can further be affected by traffic conditions, road conditions, and other factors. At box 76, adaptive navigation guidance is provided to drivers based on the analyzed navigation error data. As discussed previously, the adaptive guidance can include more or fewer notifications of an upcoming maneuver, modified timing of notifications, descriptive explanations of a particularly troublesome turn or exit, speed and lane position guidance, and many other types of adaptation.

Using the methods disclosed herein, navigation guidance provided to drivers can be adaptively improved by recording and analyzing past navigation errors. The adaptive guidance can reduce navigation errors for error-prone drivers and troublesome roads and routes, thereby improving both the safety of drivers and the satisfaction of navigation system users.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing adaptive guidance for driver navigation, said method comprising:
    recording navigation error data for navigation errors detected by navigation systems in a plurality of vehicles, where the navigation errors include missing a turn, missing a highway exit, turning at a wrong location, turning in a wrong direction, taking a wrong highway exit, and driving past a selected final destination;
    providing the navigation error data to a server computer including a processor and a memory;
    analyzing, on the server computer, the navigation error data to detect patterns in the navigation errors from the plurality of vehicles, including patterns of errors made by an individual driver and patterns of errors made at a particular roadway location;
    incorporating information about the patterns in the navigation errors as a property in a route planning system; and
    providing adaptive driver navigation guidance from the server computer to the navigation system in at least one of the vehicles for use by a driver, where adaptations in guidance are made based on the patterns in the navigation errors, and the adaptations in guidance are designed to reduce a driver navigation error likelihood.

2. The method of claim 1 wherein the server computer communicates with a route planning system which provides the adaptive driver navigation guidance.

3. The method of claim 1 wherein analyzing the navigation error data and providing adaptive driver navigation guidance are performed on the navigation system in the vehicle.

4. The method of claim 1 wherein the navigation errors include navigation system errors and driver errors, and the driver errors are detected by actions including route recalculation, driver request for more information, and departure from a planned route.

5. The method of claim 1 wherein the navigation error data includes date and time, roadway location of the vehicle, type of navigation error, information about the vehicle, driver identification, vehicle speed, roadway properties, road conditions and traffic conditions.

6. The method of claim 1 wherein analyzing the navigation error data includes using machine learning techniques.

7. The method of claim 1 wherein adaptations in guidance include increasing or decreasing a number of notifications to a driver, changing timing of the notifications, recommending a change of vehicle speed or lane position, and adding supplemental explanation of an upcoming maneuver.

8. The method of claim 1 wherein the method is applied to routing for location-based services promotions.

9. A method for providing adaptive guidance for driver navigation, said method comprising:
    recording navigation error data for navigation errors detected by navigation systems in a plurality of vehicles, where the navigation errors include navigation system errors and driver errors, and the driver errors are detected by actions including route recalculation, driver request for more information, and departure from a planned route, and where the navigation errors include missing a turn, missing a highway exit, turning at a wrong location, turning in a wrong direction, taking a wrong highway exit, and driving past a selected final destination;
    communicating the navigation error data to a server computer including a processor and a memory;
    analyzing the navigation error data on the server computer to detect patterns in the navigation errors from the plurality of vehicles, including patterns of errors made by an individual driver and patterns of errors made at a particular roadway location;
    incorporating information about the patterns in the navigation errors as a property in a route planning system; and
    providing adaptive driver navigation guidance from the route planning system from the server computer to the navigation system in at least one of the vehicles for use by a driver, where adaptations in guidance are made based on the patterns in the navigation errors, and the adaptations in guidance are designed to reduce a driver navigation error likelihood.

10. The method of claim 9 wherein the navigation error data includes date and time, roadway location of the vehicle, type of navigation error, information about the vehicle, driver identification, vehicle speed, roadway properties, road conditions and traffic conditions.

11. The method of claim 9 wherein adaptations in guidance include increasing or decreasing a number of notifications to a driver, changing timing of the notifications, recommending a change of vehicle speed or lane position, and adding supplemental explanation of an upcoming maneuver.

12. A system for providing adaptive guidance for driver navigation, said system comprising:
    a plurality of vehicles each equipped with a navigation system configured to detect navigation errors and record navigation error data for the errors, where the navigation errors include missing a turn, missing a highway exit, turning at a wrong location, turning in a wrong direction, taking a wrong highway exit, and driving past a selected final destination;
    an error analyzer running on a server computer which receives the navigation error data from the navigation systems in the plurality of vehicles, said error analyzer being configured to detect patterns in the navigation errors from the plurality of vehicles, including patterns of errors made by an individual driver and patterns of errors made at a particular roadway location, said server computer including a processor and a memory; and a route planner incorporating information about the patterns in the navigation errors as a property in a route planning system and configured to provide adaptive driver navigation guidance to the navigation system in at least one of the vehicles for use by a driver, where adaptations in guidance are made based on the patterns in the navigation errors, and the adaptations in guidance are designed to reduce a driver navigation error likelihood.

13. The system of claim 12 wherein the navigation errors include navigation system errors and driver errors, and the driver errors are detected by actions including route recalculation, driver request for more information, and departure from a planned route.

14. The system of claim 12 wherein the navigation error data includes date and time, roadway location of the vehicle, type of navigation error, information about the vehicle, driver identification, vehicle speed, roadway properties, road conditions and traffic conditions.

15. The system of claim 12 wherein adaptations in guidance include increasing or decreasing a number of notifications to a driver, changing timing of the notifications, recommending a change of vehicle speed or lane position, and adding supplemental explanation of an upcoming maneuver.

16. The system of claim 12 wherein the system is applied to routing for location-based services promotions.

* * * * *